Aug. 21, 1945.     J. J. CURRY     2,382,978

CAPSULE

Filed March 17, 1943

INVENTOR.
JOHN J. CURRY
BY
Caesar and Rivise
ATTORNEYS

Patented Aug. 21, 1945

2,382,978

UNITED STATES PATENT OFFICE 2,382,978

CAPSULE

John J. Curry, Philadelphia, Pa.

Application March 17, 1943, Serial No. 479,449

1 Claim. (Cl. 206—47)

The present invention concerns itself with capsules of the duplex type. As indicated by the term "duplex," this type of capsule has two compartments for separately storing substances, which are eventually to be mixed together for use. As examples of substances, which may be stored together in this way may be mentioned the ingredients of Sedlitz powders and the ingredients of dental amalgams.

The invention will be described with particular reference to dental amalgams. This is one of the most promising applications of the invention, and lends itself especially well for the specific disclosure of the invention required by the patent statutes.

The preparation of amalgams constitutes a large proportion of the dentist's work. Unfortunately, amalgams must be prepared fresh; hence they cannot be prepared in advance either by the individual dentist or the dental supply house. Prior to this invention, the dentist had to measure out the necessary quantities of mercury and metal powder and comminute or triturate them together in a mortar and pestle. The weighing out of the ingredients has to be done very carefully, and the comminuting has to be done very rapidly. Otherwise, there is considerable waste of materials and the amalgam does not contain the proper proportions for a desired filling. The metal powder is usually measured out on an accurate balance, and the mercury may be measured out from a mercury dropper jar, which dispenses a predetermined quantity of mercury in each drop. The comminuting may be done in a hand-operated mortar and pestle or in an electrical device. One form of electrical device has a vibrating arm adapted to hold a small gelatin capsule containing the two ingredients to be mixed.

The principal object of the invention is to provide a duplex capsule adapted to contain the ingredients of a dental amalgam in separate compartments and to bring them together in a single compartment whenever desired without rupturing any part of the capsule, said capsule also being adapted to be placed in an electrical device for intimately mixing the ingredients together.

Another object is to provide a duplex capsule of very simple and relatively inexpensive construction, which can be made on large commercial scale.

In its very essence, the capsule of the invention consists of two tubular sections, which, for convenience, may be referred to as a main section and a subsidiary section, the subsidiary section being provided with an open end telescopically received over one end of the main section, two chambers provided in said capsule, said chambers communicating through an aperture, and means actuated by moving the two sections relative to each other to close and open the aperture between the chambers at will.

Reference will now be had to the drawing, wherein are illustrated two representative embodiments of the invention.

Figure 1:
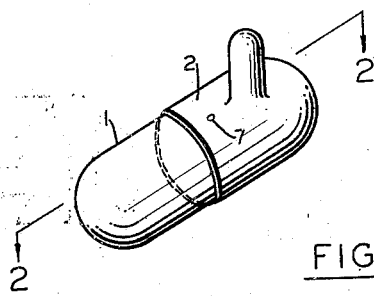
Figure 1 is a view in perspective of the preferred embodiment of the invention.
Figure 2:
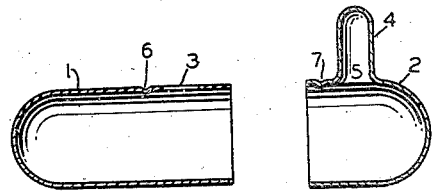
Figure 2 is a cross-sectional view on line 2—2 of Figure 1, the two sections of the capsule being shown in separated relation.

Referring now in greater detail to the embodiment of the invention shown in Figures 1 to 4 inclusive, the reference numerals 1 and 2 designate two tubular sections of a capsule, which may advantageously be made of a transparent plastic material such as gelatin, Cellophane, cellulose acetate, acrylic resin, etc.

The section 1, which may be considered the main section, has a closed end and an open end, as in the case of conventional types of capsules. The section 2, which may be considered as the subsidiary section, also has an open end and a closed end, and is telescopically received over the open end of the main section. The main section is provided on its periphery as shown with an aperture 3.

The section or cap 2 is provided with a side arm 4 extending substantially at right angles to the length of the capsule. The side arm communicates with the section 2 through an opening 5. The aperture 3 in the main section 1 is about the same size as the opening 5, and is so placed on the periphery of the main section as to be adapted to be brought into and out of registration with the opening 5 by turning the two sections relative to each other, or by slidably moving the sections. In actual practice, it has been found preferable to accomplish this function by turning rather than by slidably moving the sections in respect to each other.

Figure 3:
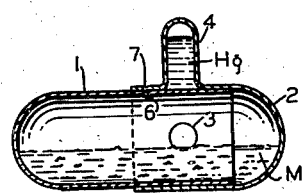
Figure 3 is a cross-section substantially on line 2—2 of Figure 1, the body portion of the capsule and the side arm thereof each containing one of the ingredients to be mixed, and the aperture in the body portion being out of register with the side arm.

In Figure 3, the two sections are shown positioned so that the aperture 3 is out of registration or alinement with the opening 5. There is thus provided two separate chambers—a main chamber extending through the two sections of the capsule, and a subsidiary chamber in the side arm 4. Cooperating indentations 6 and 7 may be provided on the surface of the sections 1 and 2 respectively to prevent accidental rotation of one section with respect to the other.

As shown in Figure 3, the subsidiary chamber 4 is adapted to contain one of the two ingredients, in this case mercury (Hg), and the main chamber is adapted to contain the other ingredient, in this case metallic powder (M). The two materials are preferably measured out very accurately, so that when they are brought together they will be in the exact proportions to make a dental amalgam for a filling of predetermined size.

To bring the ingredients of the amalgam together, it is merely necessary to rotate the section 1 in reference to the section 2, thereby bringing the aperture 3 into registration with the opening 5. The two sections of the capsule may be of contrasting colors, so as to facilitate bringing the opening and aperture into registration.

Figure 4:
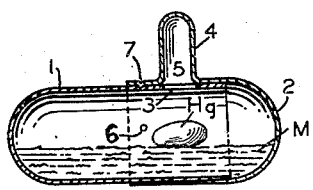
Figure 4 is a similar view, with the exception that the aperture in the body portion is in register with the side arm, and the two ingredients are contained in the body portion of the capsule.

Figure 4 illustrates the capsule when the opening and aperture are in registration. The ingredient contained in the side arm 4, in this case mercury, falls through the alined openings into the main chamber, coming into contact with the second ingredient, in this case metallic powder. The two ingredients can now be mixed together in any desired or suitable manner. One particularly suitable way is to place the capsule in a mechanical mixer or mortar, preferably provided with an automatic timing device. Hence, it is unnecessary for the dentist to open the capsule until the mixing is complete.

The embodiment illustrated in Figures 5 to 8 differs from the preferred embodiment in detail of construction. This embodiment consists of two telescopic sections 10 and 11, the section 10 being the main body portion and the section 11 being a cap or closure for the main section.

The main section is provided at one end with a partition 12, in which there is a hole or aperture 13. The section 11 is provided with a partition 14 near the closed end thereof, forming a subsidiary chamber 15. The partition 14 is provided with an aperture or opening 16.

Figure 5:
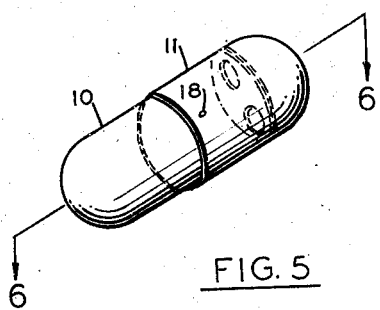
Figure 5 is a perspective view of the second embodiment of the invention.
Figure 6:
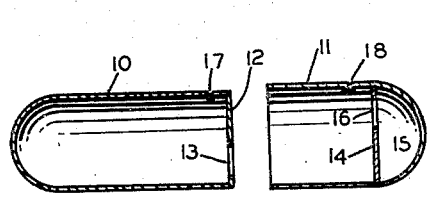
Figure 6 is a cross-section taken substantially on line 6—6 of Figure 5, the two sections being shown in separated relation.
Figure 7:
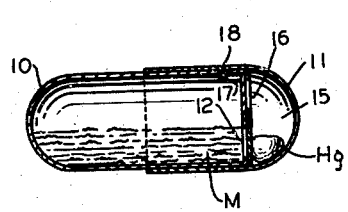
Figure 7 is a cross-section on line 6—6 of Figure 5, the two sections of the capsule each containing one of the ingredients to be mixed, and the apertures in the two sections being out of register.
Figure 8:
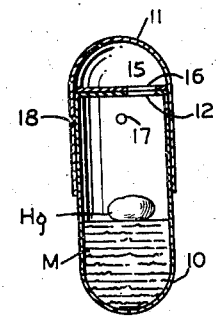
Figure 8 is a longitudinal cross-section through the capsule standing on end, the apertures in the two sections being in register, and the two ingredients being contained in the main section.

As shown in Figures 5, 7 and 8, the section 11 fits over the end of the section 10 with the two partitions 12 and 16 in direct contact. The two sections are adapted to be turned relative to each other so that the openings 12 and 16 are either out of register as shown in Figure 7, or in register as shown in Figure 8. The two sections of the capsule may be provided with the cooperating indentations 17 and 18 to prevent accidental or unintentional rotation of the two sections.

The capsule of the second embodiment may be made of the same materials as the preferred embodiment.

In Figure 7, the two sections of the capsule are shown with the apertures 12 and 16 in non-registering position. As shown, the capsule has two separate chambers—a main chamber extending through the main section 10 and part of the section 11, and a subsidiary chamber 15 in one end of the section 11. The main chamber may contain one of the ingredients, in this case metallic powder M, and the subsidiary chamber may contain the other ingredient, in this case mercury (Hg).

To bring the two ingredients together, the capsule is stood on end with the subsidiary compartment 15 uppermost, and the section 11 is rotated or turned to bring the apertures 12 and 16 into registration or alinement. The mercury will fall through the alined openings into the main compartment. The capsule may then be agitated, as in a mechanical mixer, to produce a thorough admixture of the two ingredients.

From the foregoing description of the invention, it is thought to be clear that I have provided a duplex capsule, which possesses many desirable features of structure and advantage; and which is susceptible of modification in its form, proportions, detail construction and arrangement of parts without departing from the underlying concept of the invention and without sacrificing any of its advantages.

I claim:

A capsule consisting of a main tubular section and a subsidiary tubular section, each section being provided with an end wall and an open end, the periphery of the main section being provided with an aperture, the subsidiary section being provided with a side arm communicating with the subsidiary section, the open end of the subsidiary section being telescopically received over the open end of the main section, the two sections being adapted to be moved in respect to each other so as to bring the aperture in the main section into and out of registration with the side arm of the subsidiary section.

JOHN J. CURRY.